United States Patent [19]
Sheldon et al.

[11] Patent Number: 5,606,429
[45] Date of Patent: Feb. 25, 1997

[54] COPIER APPARATUS AND METHOD WITH FLEXIBLE SOURCE DOCUMENT ENTRY SCANNING IN AN IMAGE OVERLAY MODE

[75] Inventors: Eric G. Sheldon, Holley; Ronald W. Stephens; George R. Vorhauer, both of Rochester, all of N.Y.

[73] Assignee: Eastman Kodak Company, Rochester, N.Y.

[21] Appl. No.: 382,547

[22] Filed: Feb. 2, 1995

[51] Int. Cl.$^6$ ............................................. H04N 1/387
[52] U.S. Cl. .................... 358/450; 358/453; 358/540; 399/364
[58] Field of Search .................... 358/447–448, 358/450, 452, 453, 540; 355/233, 234, 308, 319, 320, 323; 395/135; H04N 1/387

[56] References Cited

U.S. PATENT DOCUMENTS

| | | |
|---|---|---|
| 4,076,408 | 2/1978 | Reid et al. . |
| 4,124,286 | 11/1978 | Barasch . |
| 4,320,962 | 3/1982 | Takahashi et al. . |
| 4,322,157 | 3/1982 | Miura et al. . |
| 4,537,497 | 8/1985 | Masuda . |
| 4,639,791 | 1/1987 | Masaki . |
| 4,652,112 | 3/1987 | Randall . |
| 4,822,021 | 4/1989 | Giannetti et al. . |
| 4,884,097 | 11/1989 | Giannetti et al. . |
| 4,922,350 | 5/1990 | Rombola et al. . |
| 4,949,190 | 8/1990 | Thompson . |
| 5,051,843 | 9/1991 | Hayashi .................... 358/450 |
| 5,109,252 | 4/1992 | Schott, Jr. . |
| 5,289,570 | 2/1994 | Suzuki ....................... 358/450 |
| 5,309,245 | 3/1994 | Hayashi et al. ............ 358/450 |
| 5,357,348 | 10/1994 | Moro .......................... 358/450 |
| 5,438,430 | 8/1995 | Mackinlay et al. ........ 358/450 |

FOREIGN PATENT DOCUMENTS

| | | |
|---|---|---|
| 0164084 | 12/1985 | European Pat. Off. . |
| 0431396 | 6/1991 | European Pat. Off. . |

OTHER PUBLICATIONS

Research Disclos. No. 326, Jun. 1, 1991 pp. 382–385 'Copier With Mode For collating Off of Platen'.

*Primary Examiner*—Kim Vu
*Attorney, Agent, or Firm*—Norman Rushefsky

[57] ABSTRACT

A copier apparatus and method includes a scanning station for electronically scanning a set of document sheets to be copied as a copy job. The scanning station includes a platen for supporting a document sheet to be scanned in a first mode wherein the document sheet is manually positioned on the platen by an operator. This document sheet serves as a master and the image thereon is used for copying onto copies made of other document sheets in the set. The scanning station further provides for scanning of the document sheets in a second mode wherein document sheets are automatically fed. A controller automatically actuates the scanning station for scanning a document sheet in the first mode and also actuates a feeder for automatically feeding document sheets to the scanning station for scanning document sheets in the second mode. A memory stores image data of the master document sheet and this image data is logically combined with image data of each of at least plural of the document sheets scanned in the second mode. A marking engine produces one or more collated copy sets of the set of document sheets with each of at least two pages of the copy set being a combination of an image on the document sheet scanned in the first mode and an image of a document sheet scanned in said second mode. The memory stores two sets of image data for the master. A first of these two sets is stored in a first part of the memory and is used for logically combining with image data of document sheets scanned in the second mode and a second is used for replicating a set of the master image data for storage in the first part of the memory after the logically combined image data is read out. This allows for only one platen scan of the master while the image data thereof can be combined with plural different document sheets.

19 Claims, 13 Drawing Sheets

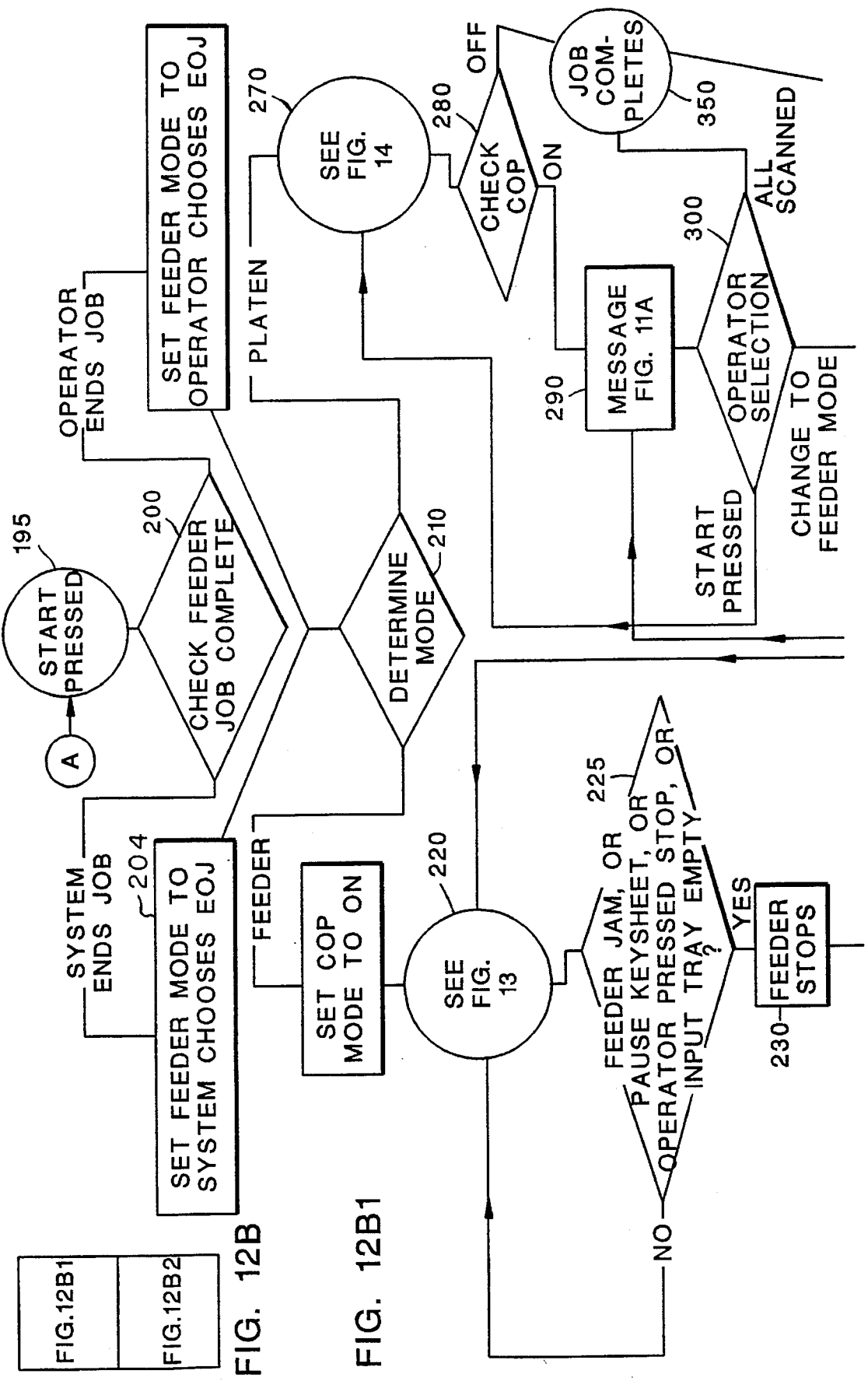

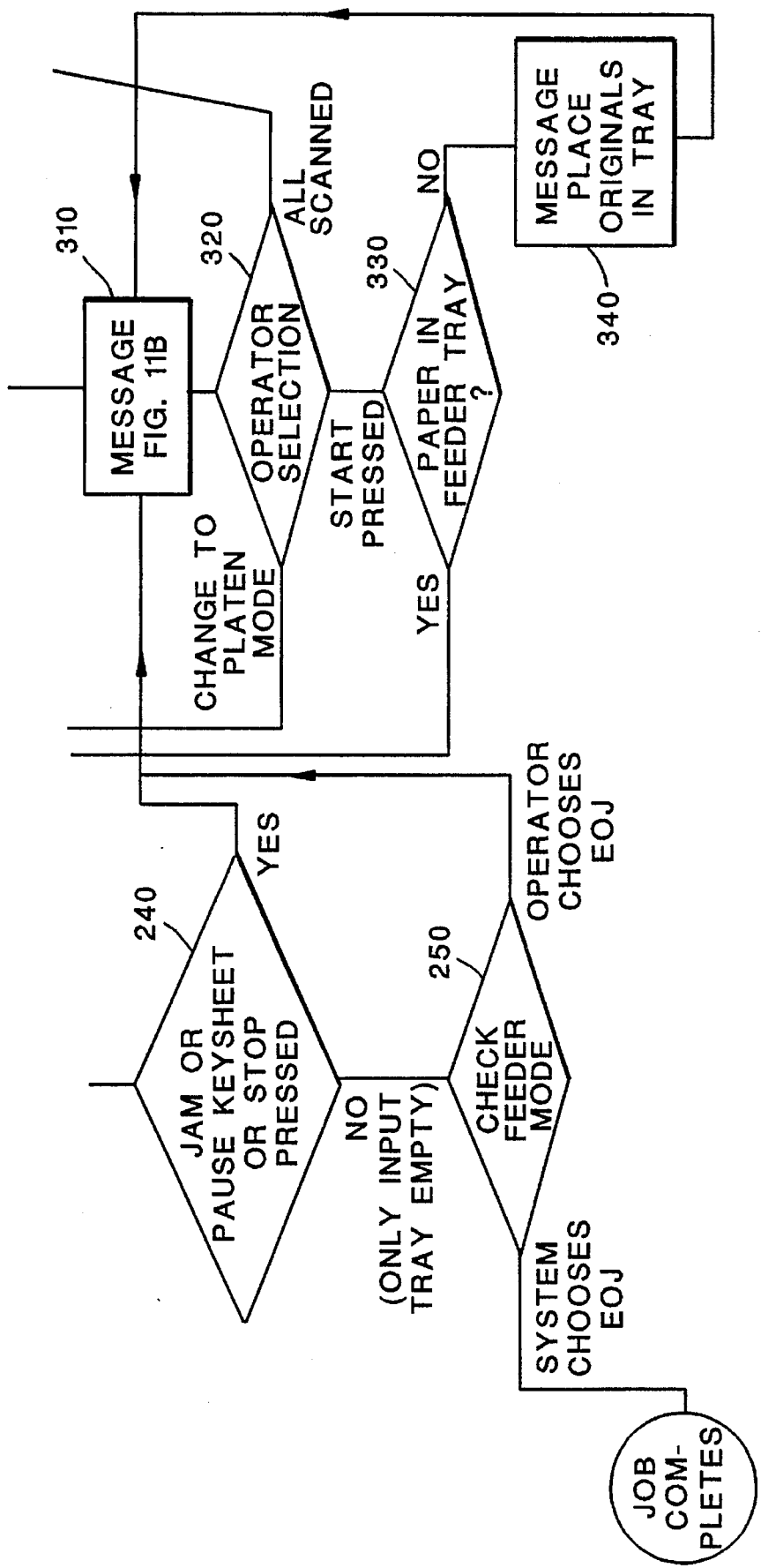
FIG. 12B2

MERGER OF CONSECUTIVE PAIRS OF ORIGINALS SELECTED.
PLACE FIRST ORIGINAL TO MERGE ON PLATEN GLASS
PRESS <START> OR <PROOF> TO SCAN

FIG. 15

MERGER OF CONSECUTIVE PAIRS OF ORIGINALS SELECTED.
PLACE ORIGINALS TO BE MERGED IN HOPPER OR FOR NONCOLLATE JOB USING PLATEN, PLACE FIRST ORIGINAL ON PLATEN GLASS.
PRESS <START> OR <PROOF> TO SCAN

FIG. 16

PLACE NEXT ORIGINAL TO BE MERGED ON PLATEN GLASS PRESS <START> OR <PROOF> TO SCAN

FIG. 17

COPIER APPARATUS AND METHOD WITH FLEXIBLE SOURCE DOCUMENT ENTRY SCANNING IN AN IMAGE OVERLAY MODE

CROSS-REFERENCE TO RELATED APPLICATION

This application is related to application Ser. No. 08/343,407, filed on Nov. 22, 1994 and entitled "Copier Apparatus and Method with Flexible Source Document Entry Scanning" and commonly assigned herewith.

BACKGROUND OF THE INVENTION

1. Field of the Invention

The present invention relates generally to electronic copier apparatus such as electrostatographic copiers and methods for using same, and more particularly, to electronic copier apparatus and methods for making collated sets of reproductions.

2. Brief Description of the Prior Art

As noted in U.S. Pat. No. 4,076,408, it is well known in the prior art to provide convenience copiers with document feeders that present the individual document sheets to the copier, one-after another or seriatim, in a manner suitable for producing collated copies without a sorter.

In such apparatus, the original comprising a set of individual sheets, is automatically circulated for presentation to an optical exposure station, one sheet after another for copying.

More recently, an improvement in copying is provided by using electronic collating copiers such as described in U.S. Pat. No. 4,949,190. In such electronic copiers, image data is "read" by scanning an original document sheet with an electronic scanner so that optical image information on the original is converted to a stream of electronic video or image data. The video data may be stored in multi-page buffer memories. When a plurality of copy sets of a multi-page document are to be produced as a copy job, the stored video data for each page are repeatedly sent to the printer in proper page order such that the reproduction sets are automatically collated without use of a sorter.

As used herein, the term "electronic copier" is meant to refer to apparatus arranged for reading the image information on an original document sheet and converting the information to electronic data and for reproducing such image information on a receiver or copy sheet, which is a "hard copy." The term "copy job" is used in its conventional sense and implies operation of the apparatus in a copier mode to produce one or more hard copy sets from a production job requiring copying of an original document having one or more hard copy pages in accordance with predetermined parameters requested for producing said copy sets.

In known copiers such as the KODAK 1575 Copier/Duplicator manufactured by Eastman Kodak Company, Rochester, N.Y., a copy job to be copied may have its originals scanned in via use of the platen or an automatic document feeder (ADF), but not both except when using key sheets in the ADF and a pause mode is selected for the key sheet. In this electronic copier, the user is allowed to select the platen or the ADF at the beginning of a job as the source for inputting originals. If the ADF is selected, the user is allowed to place key sheets in the original stack at appropriate locations to cause the ADF to pause when the key sheet is advanced by the feeder and sensed by key sheet sensors in the feeder. At this point, the operator of the electronic copier may request that a document sheet placed on the platen be scanned. On this electronic copier, a key sheet is a paper sheet with slotted holes which signals the copier that a different combination of features should be used and/or where pause has been preselected for key sheets causes the pause mode to be entered by the electronic copier and a prompt displayed allowing the operator to have scanning of one of the original document sheets by placement on the copier's platen. The key sheets are placed in the set of original document sheets directly before the original document sheet in the stack of originals that is to be changed or in which copies of the original document sheet scanned off the platen is to be positioned in finished copy sets. For every page to be scanned from the platen, a separate key sheet must be used. Key sheets may also be used for inserts or covers. When the ADF input paper tray becomes empty, the scanning of originals is complete, therefore the job is complete. If the platen is selected at the start of a job, the ADF cannot be used as a source of document input. However, one or more originals may be scanned from the platen in what is known as a collate off platen mode and a copy job produced using this mode.

The above noted KODAK 1575 Copier/Duplicator has the capability of merging the information from two separate scanned-in document sheets into one output copy. This feature is called image overlay, and can be applied for the entire job or for a designated pair of sheets within a job. Memory capacity in a buffer memory associated with the scanner forces a size limitation of the original to 8.5"×11" portrait or A4 portrait size paper. For feeder jobs with job level image overlay selected, every two consecutive scanned document sheets will be combined. Only scans from the feeder can be combined unless a pause key sheet stops the scanning and allows for a scan from the platen. At this point, the operator must intervene and press the START button for each scan of an original from the platen glass. After the platen scan(s), the operator must press the START button again to resume copying from the feeder.

The inventors have recognized that an electronic copier that is more flexible in allowing inputs from the ADF and the platen for scanning of a copy job requiring an image overlay mode would be highly desirable.

It is therefore an object of the invention to provide an electronic copier with improved flexibility in entry of image data for a copy job involving image overlay.

SUMMARY OF THE INVENTION

The above and other subjects of the invention which will become apparent upon reading the specification are realized by a copier apparatus comprising a scanning station having a scanner for electronically scanning a set of document sheets to be copied as a copy job; a buffer memory means having a memory for storing image data of two document sheets; control means for operating said scanner for scanning one document sheet of said set of document sheets and for storing duplicative sets of image data of said one document sheet in said buffer memory means, said control means including means for logically combining in said buffer memory means one of said duplicative sets of image data of said one document sheet with image data of a different document sheet of said set and for outputting logically combined image data of both sheets to a marking engine while retaining a second set of said duplicative sets for recopying of image data of said one document sheet into said buffer memory means; and a marking engine for producing a collated copy set of said set of document sheets with each of at least two sheets of said copy set featuring a combination of image data from said one document sheet and image data from another document sheet in said set of document sheets.

In accordance with another aspect of the invention, there is provided a copier apparatus comprising means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed; feeder means for automatically feeding seriatim document sheets to the scanning station for scanning document sheets in the second mode; recording means for copying images of said document sheets; and control means for actuating said scanning station for automatically commencing scanning of said document sheet to be scanned in said first mode and without further operator intervention commencing scanning of document sheets to be scanned in said second mode and for actuating said recording means for producing collated copies of said document set as a copy job with one copy sheet in said copy set featuring image overlaying of an image on said document sheet with at least one other document sheet in said set.

In accordance with a third aspect of the invention, there is provided a method for copying document sheets comprising electronically scanning a set of document sheets to be copied as a copy job, the scanning being performed both in a first mode wherein a document sheet is manually positioned on the platen by an operator and in a second mode wherein document sheets are automatically fed; displaying options for selection by an operator including selection of scanning at least one of said documents in the first mode or scanning of document sheets in said second mode and an option allowing the operator to identify that all document sheets are scanned in this copy job; in response to operator inputs, that are in response to display of said options, generating signals representing selections by said operator to said options; and in response to said signals scanning said document sheets in said first mode and said second mode and producing a collated copy set of said document set as a copy job with each of at least two pages of said copy set being a combination of an image on a document sheet scanned in said first mode and an image of a document sheet scanned in said second mode.

In accordance with a fourth aspect of the invention, there is provided a method for copying document sheets comprising scanning a set of document sheets to be copied as a copy job, the scanning being performed in a first mode wherein the document sheet is manually positioned on the platen by an operator and in a second mode wherein document sheets are automatically fed; storing image data of a document sheet scanned in the first mode and logically combining the image data of said document sheet with image data of each of at least plural of said document sheets scanned in the second mode; and producing a collated copy set of said set of said document sheets with each of at least two pages of said copy set being a combination of an image on the document sheet scanned in said first mode and an image of a document sheet scanned in said second mode.

In accordance with a fifth aspect of the invention, there is provided a method for copying document sheets comprising electronically scanning a set of document sheets to be copied as a copy job; storing duplicative sets of image data of one document sheet in a buffer memory; logically combining in said buffer memory one of said duplicative sets of image data of said one document sheet with image data of a different document sheet of said set and for outputting logically combined image data of both sheets to a marking engine while retaining a second set of said duplicative sets for recopying of image data of said one document sheet into said buffer memory means; and producing a collated copy set of said set of document sheets with each of at least two sheets of said copy set featuring a combination of image data from said one document sheet and image data from another document sheet in said set of document sheets.

BRIEF DESCRIPTION OF THE DRAWINGS

In the detailed description of the preferred embodiments of the invention presented below, reference is made to the accompanying drawings in which:

FIGS. 6, 7, 8, 9, 10, 11A, 11B, 15, 16 and 17 illustrate additional screen displays that may be used in accordance with the invention;

FIGS. 12A and 12B illustrate a flowchart for operation of the copier apparatus of FIG. 1 in accordance with a preferred embodiment of the method and apparatus of the invention.

DETAILED DESCRIPTION OF THE PREFERRED EMBODIMENTS

The preferred embodiments are described herein with reference to an electrophotographic copier, but it will be understood that the invention can be used in any form of black and white or color electronic copier having an automatic means for feeding document originals. The description will be directed in particular to elements forming part of, or cooperating more directly with, apparatus in accordance with the present invention. It is to be understood that elements not specifically shown or described may take various forms well known to those skilled in the art.

Figure 1:
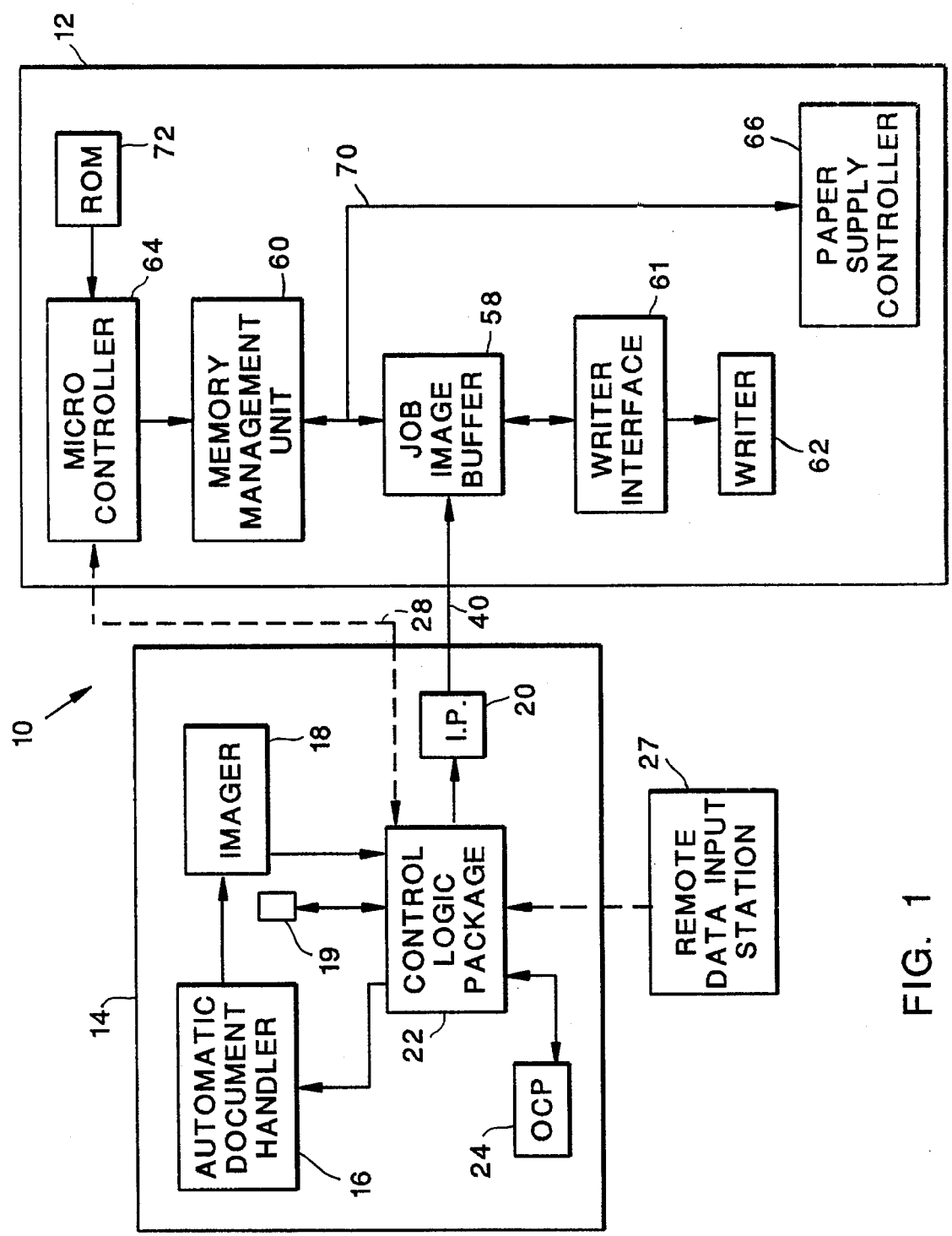
FIG. 1 is a block diagram of a copier apparatus according to a preferred embodiment of the present invention.

According to FIG. 1 and with reference to U.S. Pat. No. 5,109,252, a copier 10 includes a marking engine 12 and a document scanner assembly 14. Scanner assembly 14 comprises an automatic document feeder (ADF) or handler 16 such as, for example, a recirculating document feeder or other feeder that includes a hopper for storing a multisheet document original and feed rollers or belts for stream feeding document sheets seriatim past a scanner system and back to the hopper or to a second hopper. Focused light reflected from an original document sheet image is swept past an imager or scanner device 18 such as a linear array of photo transducers (photo diodes or charge coupled devices) for converting an image of the optical information on each original document sheet into electrical signals having values representative of the image density at associated pixel areas on the respective original document sheet.

As the scanning of the original document sheet proceeds in a direction perpendicular to the imager 18 and row of pixel areas, a series of output signals from the transducers are repetitively loaded into an associated shift register (not shown) and shifted out serially to provide a series of electrical signals having values representative of the image density of respective pixel areas in corresponding rows of pixel areas across the document image.

Scanner assembly 14 also includes a control logic package 22 having an integral data input station comprising an operator control panel 24 including buttons or input areas for the operator to input functions and to receive messages from the copier. Alternatively, setup instructions may be received via removable memory media or through signals provided from a remote data input station 27. An example of an electronic scanner is described in U.S. Pat. No. 4,822,021 and 4,884,097, the contents of which are incorporated herein by this reference.

Figure 2:
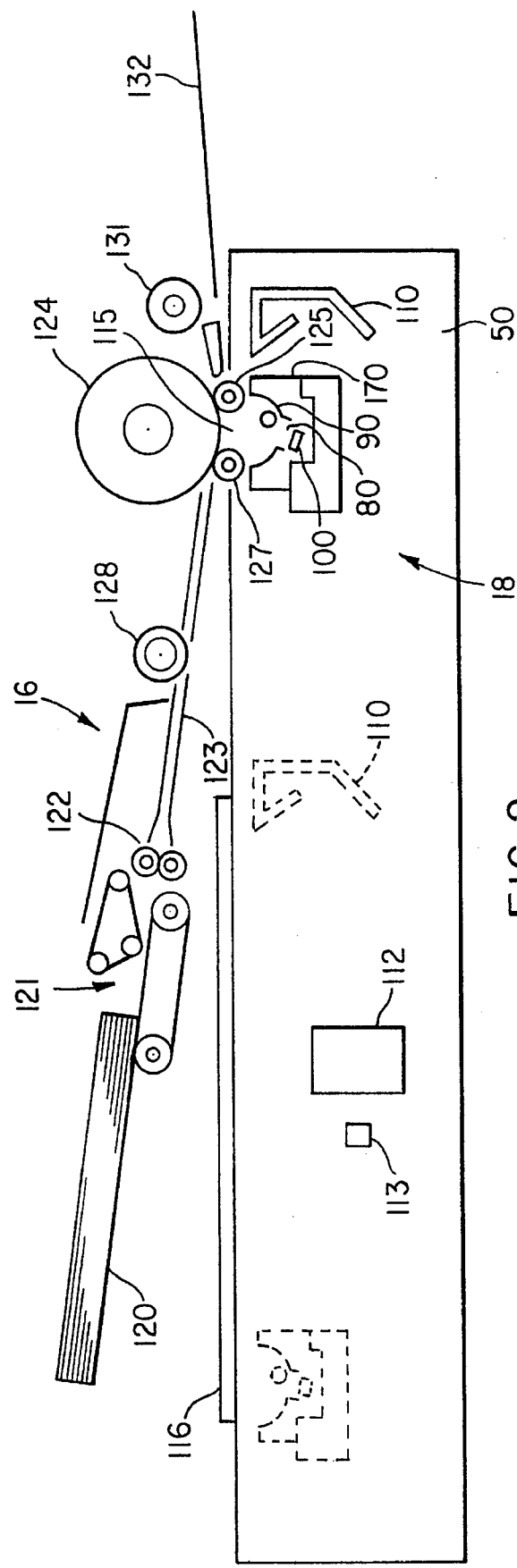
FIG. 2 is a schematic of an automatic document feeder and exposure station as known in the prior art and which is incorporated in the apparatus of the invention.

Referring to FIG. 2, an electronic scanner and automatic document handler or feeder as known in prior art, and which may be included in the apparatus of the invention, includes an illumination head 170 containing an exposure radiation source 80, an elliptical reflector 90 and a plane reflector 100. The illumination head 170 cooperates with a pair of movable mirrors 110, an objective 112 and an electrooptical image sensor having separately addressable pixels, for example, a CCD 113. Objective 112 and CCD 113 are stationary while the illumination head and pair of movable mirrors are movable from the position shown in solid lines to the position shown in phantom in FIG. 2.

When the illumination head 170 is located in the position shown in solid lines in FIG. 2., it is positioned to project onto CCD 113 an image of a moving document presented by the document handler to an exposure position 115. The illumination head 170 and mirrors 110 are movable by a pulley system, not shown, to scan an image of a document or other object manually placed on an exposure platen or glass 116 onto CCD 113. The document may be manually positioned by pivoting or raising the portion of the feeder that includes the input tray which thereby provides access for placement of the document on the platen.

The document handler 16 includes a document supply or input tray 120 into which a multisheet (or single sheet) document is placed face down. In response to pressing of a start button, S, by the operator, document sheets are fed one at a time from the bottom of the stack by a scuff separating device 121. The input tray 120, is inclined from the horizontal to gain the assistance of gravity in the separating process. Documents separated from the stack are fed by a pair of feed rollers 122 along an input path 123, defined by registration guides and having a registration roller 128 to a turnover drum 124. Turnover drum 124 is driven by drum drive rollers 125 and 127 which in turn are driven by suitable means, not shown. The document is fed across the exposure position 115 by the combined action of the drum drive rollers 125 and 127 driving both the document and the turnover drum 124. The turnover drum 124 is held tight against the drum drive rollers 125 and 127 to assure location of the document in the object plane of the objective 112.

If only one side of the document is to be scanned, a separator or diverter, not shown, is moved to a raised position which strips the document from turnover drum 124 and allows it to be fed by a simplex exit roller 131 into a simplex exit tray 132. Because the documents are placed face down in the document input tray 120 and are fed in that position across the exposure position 115 and into the simplex exit tray, and new documents are fed into the simplex exit tray on top of preceding documents, the stack of documents in the simplex exit tray ends up in the same order and orientation as in the document input tray 120.

The logic package consists of control software, interface software and logic hardware, including one or more microprocessors. Setup instructions are input to the scanner, while synchronization signals to identify separate scan lines and to provide page information and marking engine control, as well as information for finishing and processing of jobs, will be sent to marking engine 12 via a job control communications link 28. The marking engine may comprise an ink jet, thermal, photographic or electrostatographic marking engine wherein a source of electrical signals modifies a writer to print images in accordance with electronic signals. Electrophotographic marking engines such as electrophotographic marking engines using LEDs or laser writers are preferred which modulate light with image data to record on a photoconductive recording medium. Modulated electrostatic images on the medium are developed with electroscopic toners and transferred to a record copy such as plain paper or plastic sheets; see for example U.S. Pat. No. 4,949,190, the pertinent contents of which are incorporated herein by reference. The invention may be used with binary or grey level printers as is known in the art.

Figure 3:
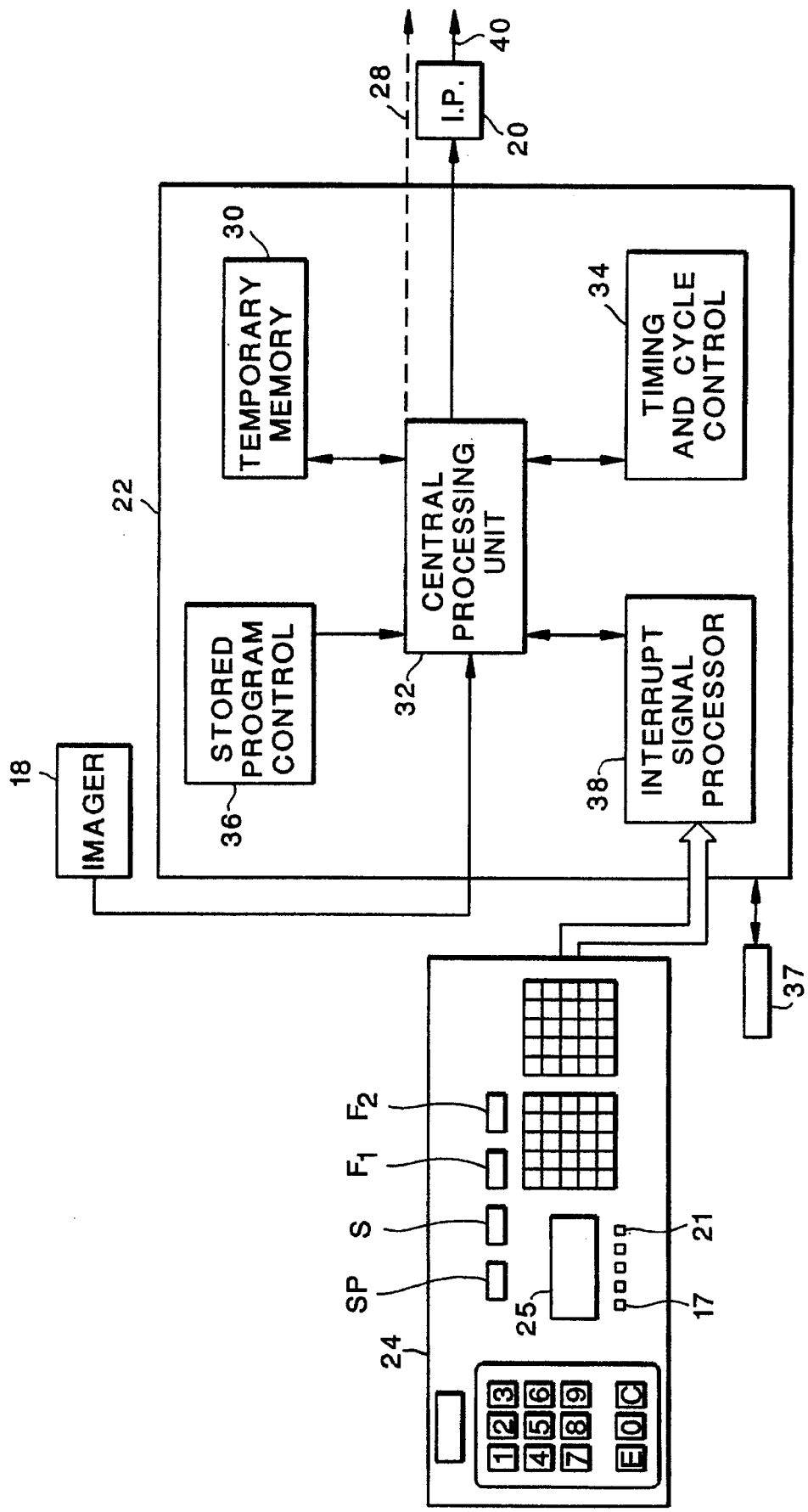
FIG. 3 is a schematic view illustrating in more detail portions of the copier apparatus of FIG. 1.

FIG. 3 includes a more detailed block diagram of control logic package 22 and operator control panel (OCP) 24 with soft-key-provided LCD display screen 25. Display screen 25 provides text, graphics and soft key selections. Messages and graphics are used to guide the operator through the various modes of operation explained below.

The control logic package (CLP 22) comprises temporary data storage memory 30, central processing unit 32, timing and cycle control unit 34, and stored program control 36. Data input and output is performed sequentially under program control. Input data are received from imager 18 in the form of an 8-bits per pixel video stream of data. Setup and control signals are received either from operator control panel 24 or a removable memory media 37 through an interrupt signal processor 38. The output data is applied through image processing electronics 20 and an image data bus 40, and control signals are applied via control communications link 28, to marking engine 12.

For purposes of description of the specific embodiment disclosed herein, it is assumed that the temporary memory 30 has sufficient scanner buffer memory (SBM) allocation therein for the storage of image data for two scanned-in document sheets of size 8½"×11 or two A4 size document sheets that are scanned-in in the portrait orientation. The CLP 22 also includes logic circuitry for copying image data within the SBM and for selectively logically merging the images stored in each half of the scanner buffer memory and outputting same to an image processor 20. In addition, the CLP 22 also includes logic circuitry for separately and selectively outputting image data from either half of the scanner buffer memory (SBM) or the entire scanner buffer memory when copying onto document sheets of say 11"×17" in size. Alternatively, output of image data from the SBM may be made by always having the image data in the SBM start at the same location so that the image data can be output line by line starting from this fixed location until the last line of the data of this image is output.

Referring again to FIG. 1 marking engine 12 receives bit stream image data over bus 40 and job control data over a communications link 28, both for storage in a multiple page buffer memory 58. The page buffer will accept electronic image data from scanner 14 and store that data until needed by a writer 62. The storage media is preferably a dynamic random access memory under the control of a memory management unit 60.

Control means, including a microcontroller 64 is arranged to perform arithmetic and logic operations and instruction decoding as well as controlling the time allocation of peripherals (such as a paper supply controller 66 and accessories communications for finishers, staplers, exit hoppers, etc.) through a machine control communications link 70. Several output functions may be available for receiver sheets including selection for output trays, stapling, sorting, folding, finishing, mailbox, envelope receiver, etc.

Microcontroller 64 has associated with it RAM for storing image location addressed, and a read-only memory 72 in which is stored various fixed forms such as test patterns, density patch patterns for process control purposes, billing forms, etc.

Figure 4:
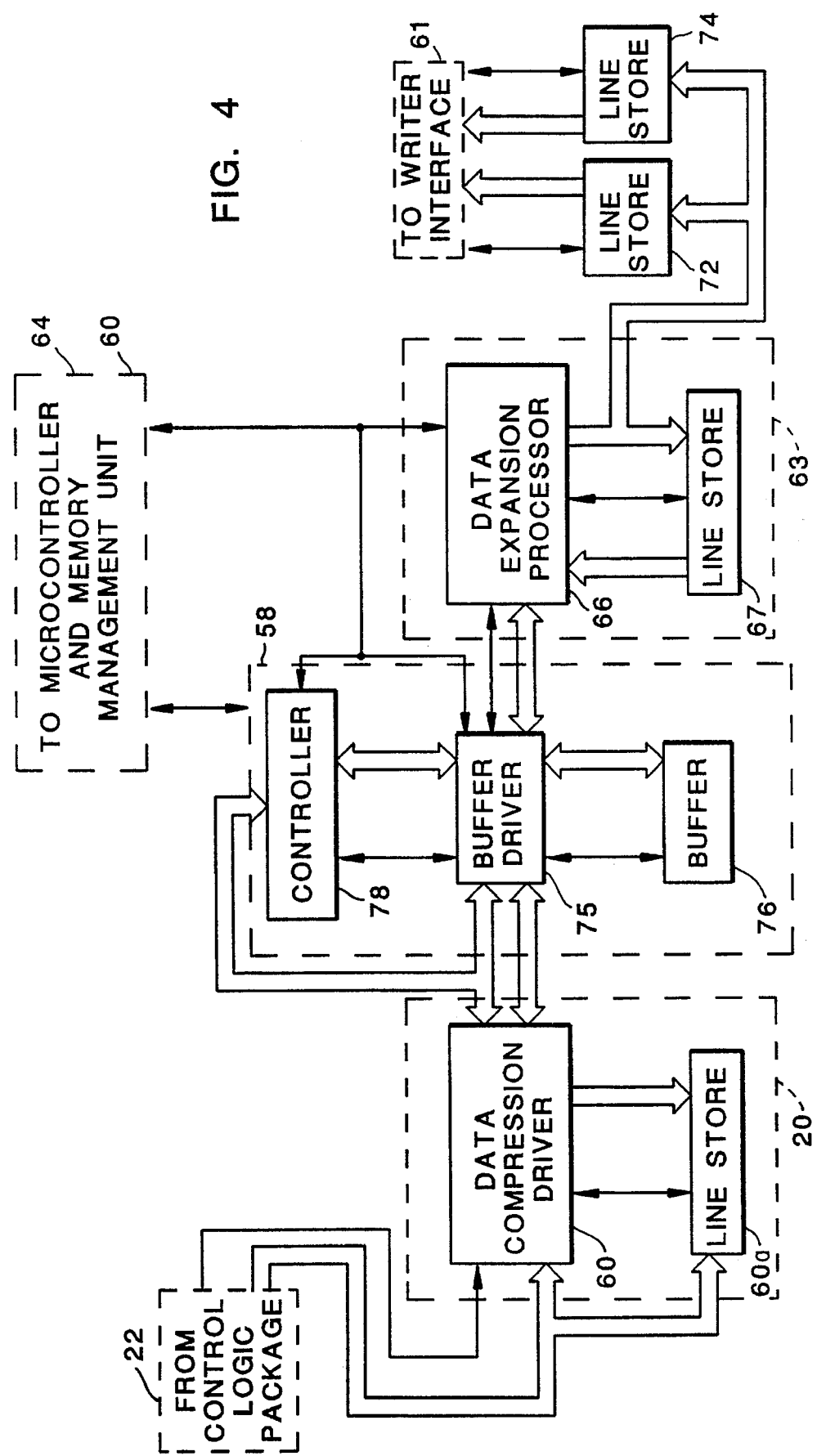
FIG. 4 is a schematic illustrating in more detail a job image buffer illustrated in FIG. 1.

With reference to FIG. 4, the image processor 20 may include a data compressor which receives the image data stream from imager 18. Data compressor is preferably a hardware implementation of an appropriate algorithm which encodes redundant information into a more compact form before passing the compressed dam stream to a multi-page buffer memory 58. The data compressor includes a data stream compression driver 60 and a line store 60a for buffering a full line's worth of data.

A data expander 63 is the companion to the data compressor, and it includes a data expansion processor 66 and a line store 67. The expander retrieves the compressed data stream from multi-page buffer memory 58 and reconstructs the output data into original form for a writer interface 61. The writer interface receives a full line of image data from the data expander as the line is processed, and has a pair of line stores 72 and 74 and random logic to resequence the data stream before sending it to printhead or writer 62.

Multi-page buffer memory 58 also known as a job image buffer or JIB is provided for storing image data of all the pages in each production job to permit the electronic recirculation of images for collation; thereby eliminating the need for a mechanical recirculating document handler. The heart of the multi-page buffer memory is a large bank of dynamic random access memory (DRAM) in a buffer 76 for storage of the image data as it is processed by data compressor 20. The buffer memory is large enough to store the data for several production jobs simultaneously wherein each job is of multiple pages.

Controller 78 and buffer driver 75 act as a direct memory access controller, allowing data compressor 20 and expander 64 direct access to DRAM buffer 76 without a microprocessor, and as a DRAM controller arbitrating between memory read, write and refresh cycles.

The microcontroller 64 functions as the system manager, overseeing the overall operation of the multi-page buffer memory, the microcontroller will handle communication with a logic and control unit (LCU) (not shown) of the marking engine, store the internal pointers identifying the beginning and ending addresses for each image, initiate transfers from the scanner assembly 14 and control the data compression and expansion process. The microcontroller and LCU comprise electronic collation means for presenting the stored image data for printing in the proper sequence, as often as it needed to produce the desired number of collated document sets whereby a plurality of electronically collated, multi-page sets can be printed as known in the prior art.

Assuming an operator has placed an original multisheet document set to be copied into a document feed hopper and set up the parameters for a copy job, e.g., number of copies for reproducing the document set and other conventional parameters, the control logic package 22 is programmed to operate as set forth below. In response to pressing of the "START" button, S, on the OCP 24, a decision is made as to whether or not documents are in the automatic document feeder (ADF). As noted above, the ADF may be a recirculating document feeder (RDF) wherein documents that are stored in a hopper are circulated to an exposure platen in serial fashion and returned to the hopper. At the exposure platen or glass which is part of imager 18, the document sheets are scanned or read during the sheet feeding operation to generate electronic signals representing the density of image information on the sheets. The ADF may also be a feeder where the documents are presented seriatim and automatically to the platen and are then fed to a stack or hopper at a different location from which originally presented. In any event, if documents are sensed by suitable known sensors to indicate that this is an ADF job, scanning of the originals in serial fashion for image information is made by the scanner. The scanner may also include scanning for automatic document recognition (ADR), see U.S. Pat. No. 4,922,350, which describes a prescan for ADR determination. As the document sheets are fed seriatim to or from the scanner, a count is made by well known means of the number of document sheets fed during this sheet feeding operation. Where scanning of a document set is made comprising a copy job, a count is kept of the number of document sheets scanned. There is also displayed on display screen 25 an indication that processing for printing of the requested number of copy sets has begun. This processing can include subjecting the incoming data to edge enhancement and/or compression, the latter to make efficient use of memory space in buffer 76. As is well known, the feeder may comprise a housing that includes a hopper for storing document sheet originals above the platen. The housing can also include the feeder devices and sensors. The housing may be lifted to allow an operator access to the glass to position a document sheet say face down on the glass for scanning by the electronic scanner device located beneath the glass. Of course, other types of scanning stations are contemplated including a separate scanner for feeder mode and one for glass mode scanning.

Figure 5:
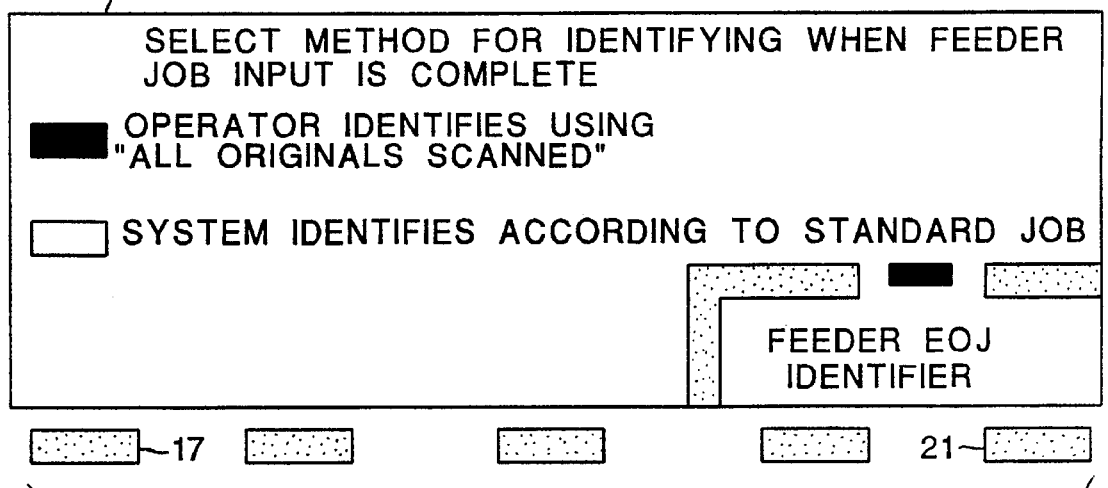
FIG. 5 illustrates a screen display that may be used in accordance with the invention to allow an operator to enter an option wherein the operator identifies the end of the job for scanning document sheets forming a copy job.

Before a copy job is started, the operator will have the option to select a special feature selection called END OF JOB (EOJ) IDENTIFIER (See FIG. 5). This special feature may be called up on the display screen 25 by pressing one of the special feature buttons $F_1$, $F_2$ on the OCP and/or in response to placement of originals in the feeder input tray. This feature has two choices: System Determined or Operator Determined. The EOJ IDENTIFIER is set to Operator Determined by the operator pressing soft key 21 which causes an "x" or other darkened indicia representing a selection to be present in the box adjacent the words "'Operator Identifies Using "ALL ORIGINALS SCANNED."' The box above the word FEEDER also is darkened to indicate the default mode is deselected. When this mode is deselected, the system will not complete the job until the user indicates that all originals have been scanned. This can be done at various points in the job. The default selection will be "System Determined," that is, the system will assume that the job is a standard job and when the last sheet is fed from the ADF's input tray and scanned, all of the originals in this copy job are considered to have been scanned. The default selection may also be obtained by again pressing soft key 21 which causes the default option to be selected because one is able to scroll between the two available options.

Figure 6:
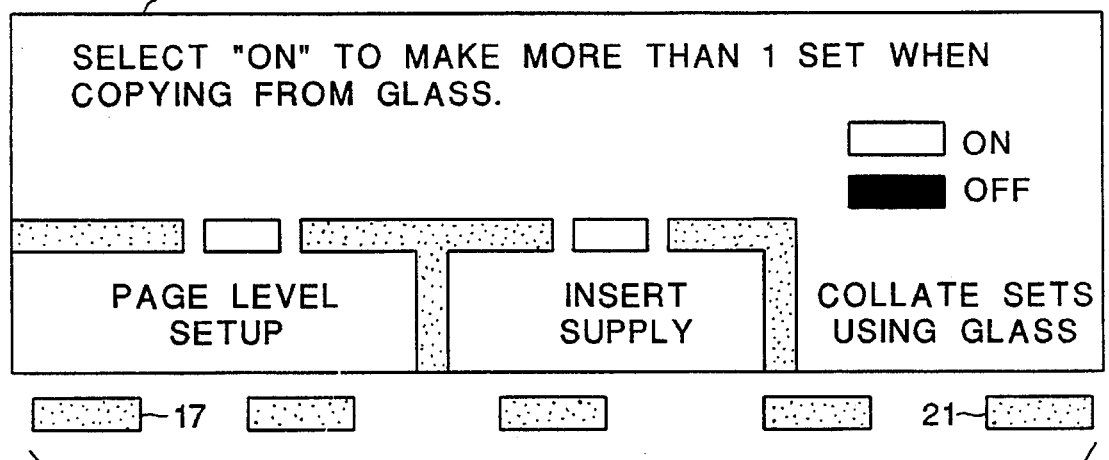
Figure 8:
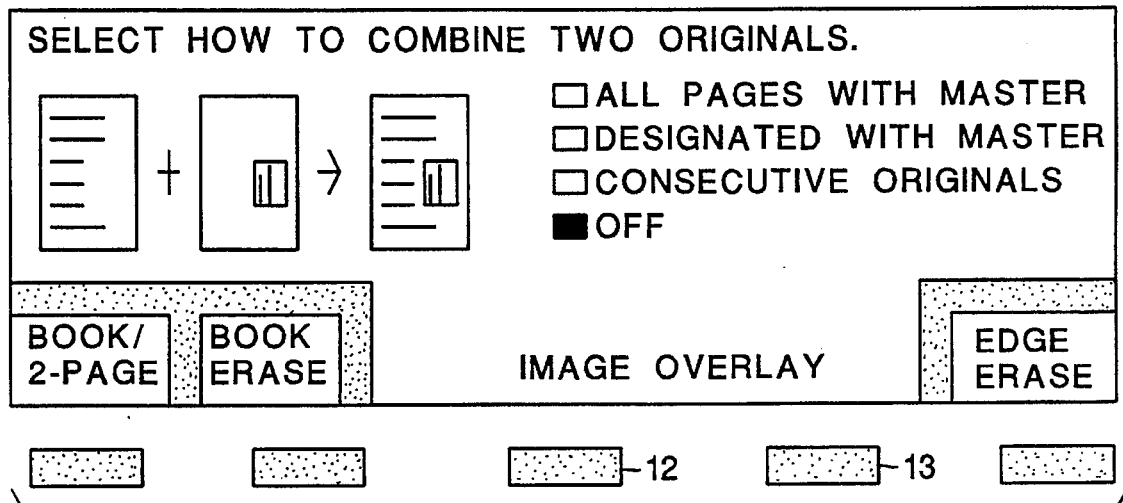

In addition to identifying how the end of the job is determined, the operator also calls up using the special feature button(s) a collate off of platen (COP) mode. In response to this call up the display of FIG. 6 is displayed on display screen 25. As noted, the COP mode is a known mode used on the aforementioned KODAK 1575 Copier/Duplicator for scanning originals manually presented to the glass or platen. By pressing soft key 21, the COP mode can be selected. As may be seen in FIG. 6 other options displayed include the ability to call up prompts for page level setups, and for designating an insert supply. With the COP mode selected and any page level setups made using other display screens of the prior art still another special feature may be selected for this copy job using the special features buttons and which will be called herein "image overlay mode." In this image overlay mode and with reference to FIG. 8, upon selection of this special feature a prompt screen is called up and illustrates what this mode accomplishes as well as provides softkeys 12, 13 that allow scrolling selection of three types of image overlay operation.

In a first type "All Pages With Master" a common master original may be placed on the platen and combined with all pages in the job. The pages in the job may be either pages scanned off of the platen; i.e. the operator places these pages on the platen or the pages may be scanned by feeding from the ADF or some of the pages in the job may be scanned off of the platen and other pages in the job scanned by feeding from the ADF.

In a second type "Designated With Master" a merging of this common master original is provided only for designated sheets. This mode may be limited to sheets fed by the ADF and wherein a designated sheet is identified by a key sheet that is placed in the document stack and fed by the ADF immediately prior to feeding of the designated sheet. Alternatively, platen prompts may be provided for each platen scan in the COP mode to allow the operator to identify a designated sheet.

In a third type of image overlay operation, pairs of consecutive originals are scanned and their data electronically merged. In this mode, operation can be either using the COP mode or ADF modes and as noted above is a known mode currently used in the KODAK 1575 Copier/Duplicator.

Figure 7:
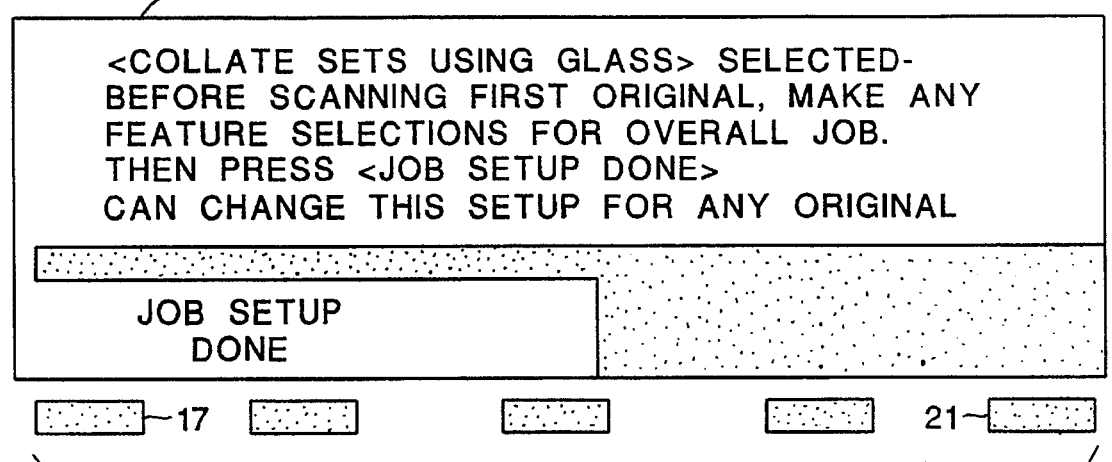
Figure 9:
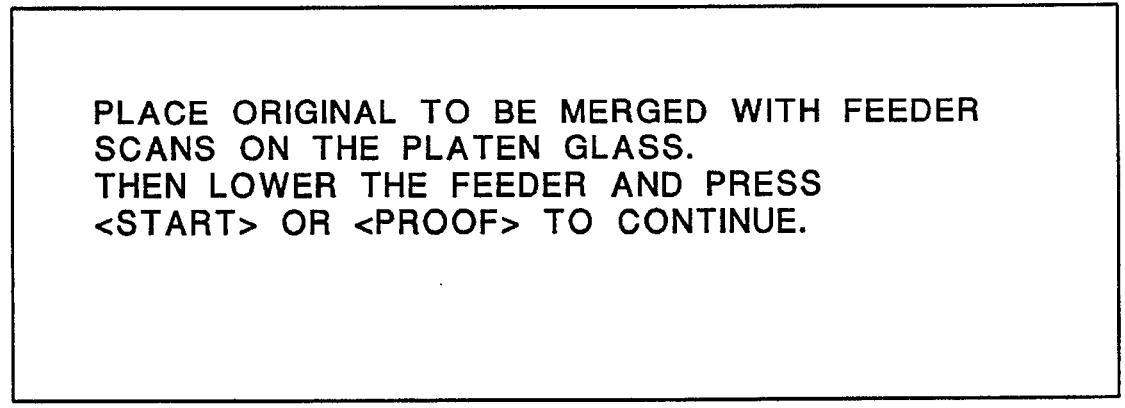
Figure 10:
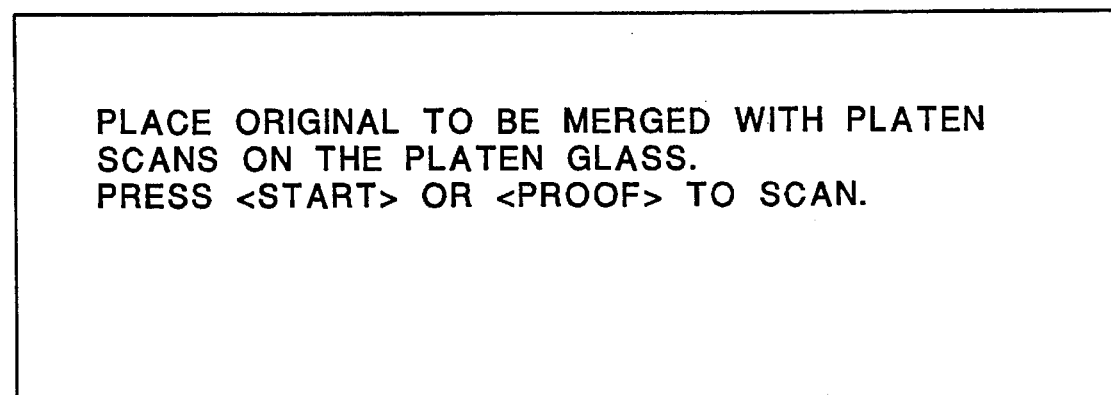

After the various special features are programmed and stored by the CLP 22, the CLP 22 will provide the display of FIG. 7 if the Collate Sets Using Glass feature selected from FIG. 6 was enabled during the job setup. The operator may make any additional feature selections for the overall job. Assume that these feature selections have been made previously such as number of copy sets, paper supply selected, etc., the operator presses soft key 17 to input a signal to the CLP 22 that the job setup is done. In response to this signal, the CLP 22 calls up one of the displays of FIGS. 9, 10, 15 or 16. The display screen of FIG. 9 is called up when COP has not been selected and originals have been placed in the feeder to provide a prompt to the operator to place on the platen the common original or master to be scanned in the copy job. The operator is also prompted to press the START button to begin the copy job. The display screen of FIG. 10 is called up when image overlay has been selected as either "All Pages with Master" or "Designated with Master" when COP has been selected or when no originals are in the feeder so that copies will be made by scanning off of the platen. However, the operator is first prompted to place the common original to be merged with platen scans on the platen glass and to press the START button to scan the common original first. The prompt of FIGS. 15 and 16 relate to use of no common original but instead provide for scanning and merger of the images on consecutive pairs of originals in the COP mode and feeder modes respectively.

Figure 12A:
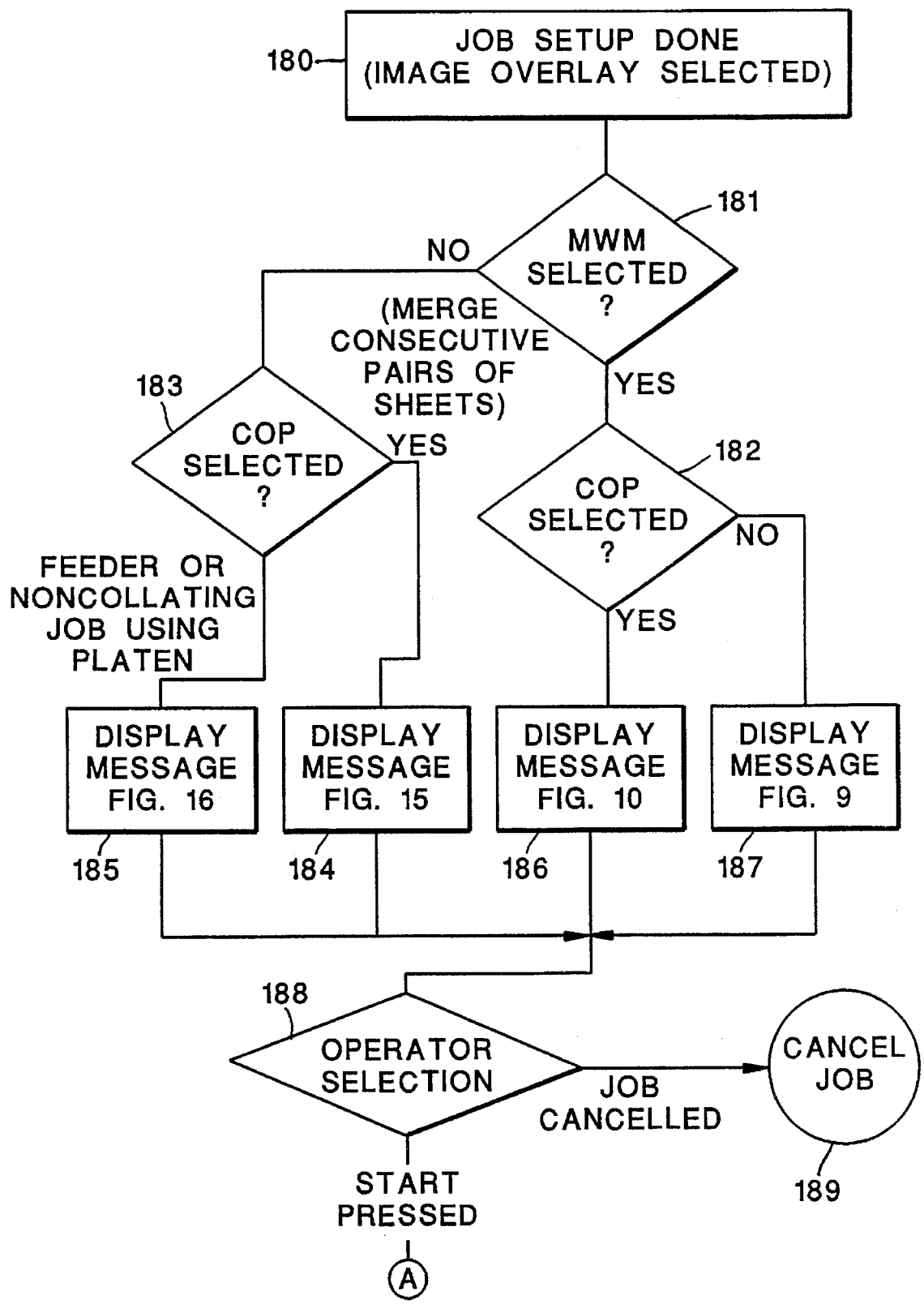

With reference now to FIGS. 12A and 12B, a flowchart of operation of the copier apparatus is illustrated. After job setup is completed (step 180), a determination is made to see if merge with master (MWM); i.e., a common original is selected (step 181). If the answer is no, then a merger of consecutive sheets is selected since a job feature involving merger has been selected using inputs during display of the display screen of FIG. 8. Assuming COP mode is selected (step 183) by the operator, the message of FIG. 15 is called up for display (step 184) which, as noted above, provides a prompt for starting the copying job by scanning of document sheet originals off the platen and merging consecutive pairs of originals. If the COP mode is not selected in step 183, then the display message of FIG. 16 is provided as discussed above for merger of consecutive pairs of originals using the feeder or this is a non-collating job using platen scans (step 185). If a merge with master is selected in step 181 then a determination is made in step 182 as to whether or not COP mode is selected (step 182). If feeder mode is selected, the display message of FIG. 9 is provided which prompts the operator to place the original to be merged with feeder scans on the platen glass, then lower the feeder and press the START button or PROOF button to continue (step 187). If COP is selected, then the display message of FIG. 10 is provided which prompts the operator to place the master original to be merged with platen scans on the platen glass and to press the START button or PROOF button to commence scanning (step 186). In step 188, a determination is made as to whether the START button is pressed or the job is canceled. To facilitate understanding of this description the option for selecting PROOF will not be described other than to note that prints of PROOF pages are preferably sent to a different output tray. The canceling of the job may be provided (step 189) by a reset button or softkey option (not shown) within each of the displays of FIGS. 9, 10, 15 and 16.

Step 195 (FIG. 12B) assumes that the START button has been pressed for one of the four merge options.

Upon pressing of the start button, the controls in CLP 22 check the signals from the sensor in the ADF's input tray to determine if there are any document sheets in the feeder's input tray (step 200). If there are document sheets in the tray, a check is made for a flag to determine if this is a copy job where the system chooses EOJ (step 204) or the operator chooses EOJ (step 208). Also, a determination is made as to whether or not the sheets are to be scanned from the feeder or the platen in accordance with inputs as noted above using input(s) in response to displays of FIGS. 9, 10, 15, and 16 (step 210). If the feeder is selected for copying of the document sheets, the collated off of the platen (COP) mode is set to be "on" even if the COP mode has not been selected by the operator as the primary copying mode.

Figure 13:
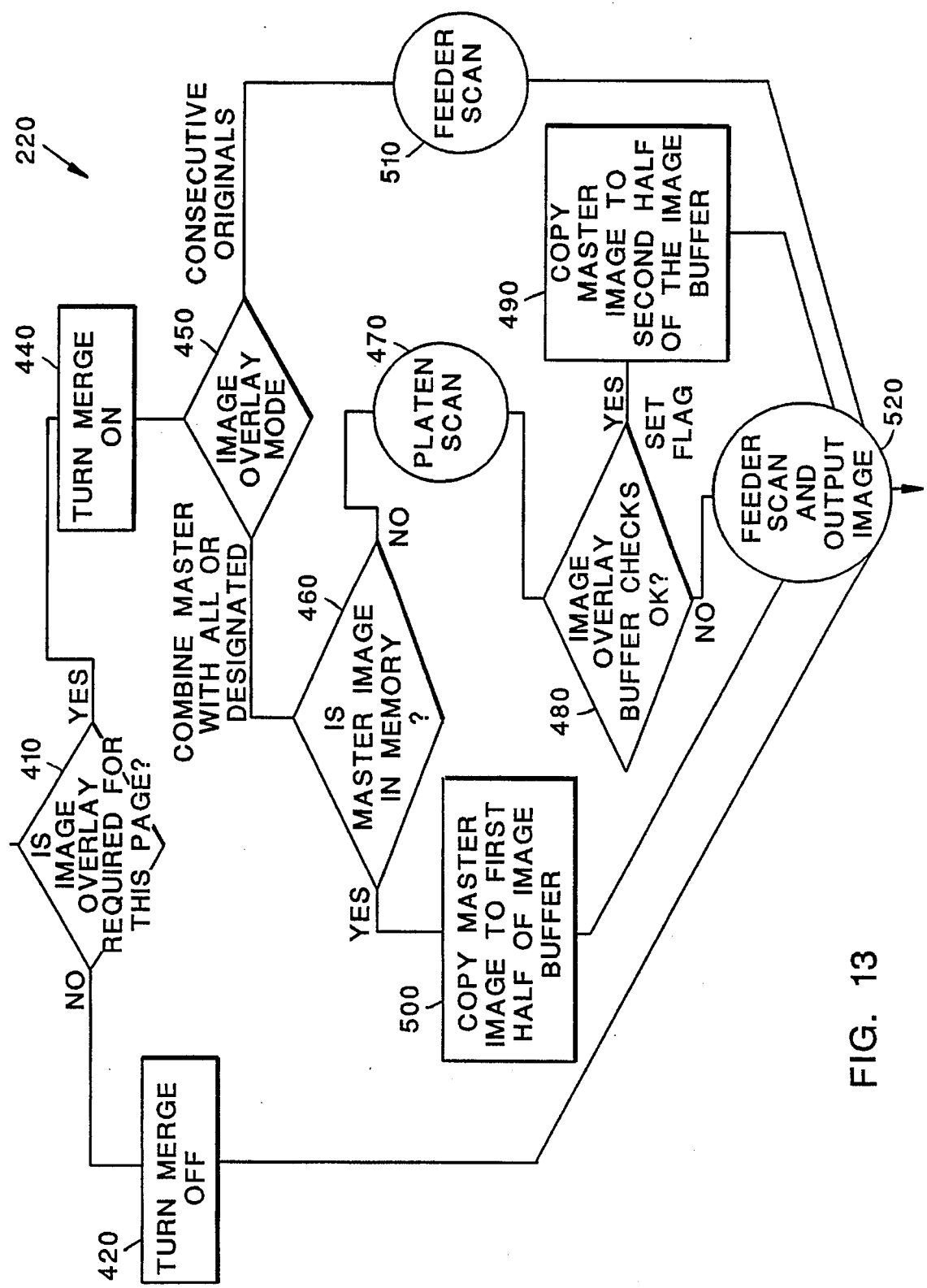
FIGS. 13 and 14 illustrate in more detail respective steps from the flowchart of FIG. 12B.

With reference now to FIG. 13, assume that merging using the feeder is selected. In step 220 a determination is first made as to whether or not image overlay is required for the first page (step 410). If the answer is no, the merging process is turned off (step 420) and a feeder scan is executed and the image data of the first page is stored in the first half of the scanner buffer memory (SBM) of temporary memory 30 (step 430). Since this is the first sheet scanned and a merge operation is not selected the image data is sent to the JIB and there is erasure of data in the SBM. Assume instead that in step 410 that image overlay is required for the first page. The merge process or logic can be turned on (step 440) and a determination made in step 450 of the type of image overlay mode. If merger of consecutive pairs of originals was selected a feeder scan is executed in step 510. The image data for the first page is stored in a first half of the SBM and then the feeder scan is executed of the next following page (step 520). The image data for the second page is merged with that of the first page and the merged image stored in the SBM. The image data for the merged image of both pages is output from the SBM to the JIB. Alternatively, data for the second page may be input into the second half of the SBM and a logic merge operation performed upon output from the SBM. As in the previous mode there is no need to retain data in the SBM after sending image data to the JIB and the image data contents of the SBM are erased upon a scan of the next page such as the third page from the feeder as the process repeats for scanning and merging each pair of consecutive document sheets. Now, if in step 450, merger of all or designated sheets with a master is selected a determination is made in step 460 of whether or not the master image is in memory. If the answer is no, an "express glass mode" scan (step 470) is made of the master which is on the platen. A sensor may be provided to detect presence of the master on the platen or the operation of the scanner may have a document recognition capability to ensure that a master is present and to detect its orientation on the platen. In the express glass mode, the platen scan is automatically executed or done without further intervention by the operator. In step 480, a check of the SBM memory addresses are made to determine if the image data for the master has been stored in no more than one-half of the SBM. An additional check is made to determine whether or not copying requirements for the master involves an accent color job or other type of image edit where it is necessary to copy part of master image to a second half of SBM and therefore there is no additional memory available in the SBM to make an additional memory copy of the master. Of course, additional SBM memory could be provided to correct for this. If the answer is no, then in step 520, a feeder scan is made of a page fed from the feeder and the image data of this page logically merged with that of the master in the SBM. The merged image data in the SBM is then output to the JIB. As the image buffer overlay checks in step 480 were determined to be negative, a flag was not set so that upon writing of image data for the next page into SBM the previous image data in the SBM is erased. If in step 480, the buffer checks are deemed okay based on the criteria described above, a flag is set and a copy of the image data of the master stored in the first half of the SBM is made to the second half of the SBM (step 490) and a feeder scan is then executed of a document sheet to be merged with the master (step 520). The image data from this document sheet is logically merged with that of the master in the first half of the SBM and the merged image data is output to the JIB. After step 520, the process exits to step 225 (FIG. 12B) to examine if a jam has occurred, or if a pause key sheet is sensed, or if the operator pressed stop or if the input tray is empty. Indeed such an inquiry may be desirably made after every scan rather than every other as indicated in the flowchart. If the answer in step 225 is no, the process returns to step 410 of FIG. 13. At this point, assuming merge is on (step 440) and image overlay mode is established for all sheets in the feeder, a determination in step 460 is now affirmative (yes) as determined by the flag set previously in step 480 and a copy of the image data of the master image that is in the second half of the SBM is now written and stored in the first half of the SBM (step 500). A feeder scan is now executed (step 520) without executing a platen scan of the master since the image data for the master is properly stored in the first half of the SBM. The image data for this scanned document sheet is now logically merged with that of the master in the first half of the SBM and the merged image data output to the JIB. This process repeats for each of the document sheets in the feeder. Where only merger with designated sheets in the feeder is selected by use of key sheets (not pause key sheets, if used, which are programmed to stop the feeder), the process is similar and begins by determining if image overlay or merging is required for this page. If the answer is no, the process automatically proceeds with steps 420, 520, 225 (FIG. 12B) and back to step 410. If a merge key sheet is detected with a feed from the feeder this implies that in a merge mode the next document sheet to be fed from the feeder is to be merged with the image data of the master stored in the first half of the SBM. When the next designated sheet in the feeder is sensed by sensing feeding of a key sheet, the process of steps 410, 440, 450 460, 500 and 520 are repeated. In the event that in logically merging the image data of the master and that of scanned document sheet from the feeder there is caused to be an overflow of data to the second half of the image buffer the flag is removed so that for an image overlay for the next document sheet to be merged using a feeder scan, the inquiry in step 460 will be answered negatively and an express platen scan made in step 470.

There is thus provided in a copier an image overlay mode of operation wherein only one scan of the master is required to be made during the scanning of the document sheets forming the production job even though image data from plural different document sheets are to be separately merged with the image data of the master.

Figure 11A:
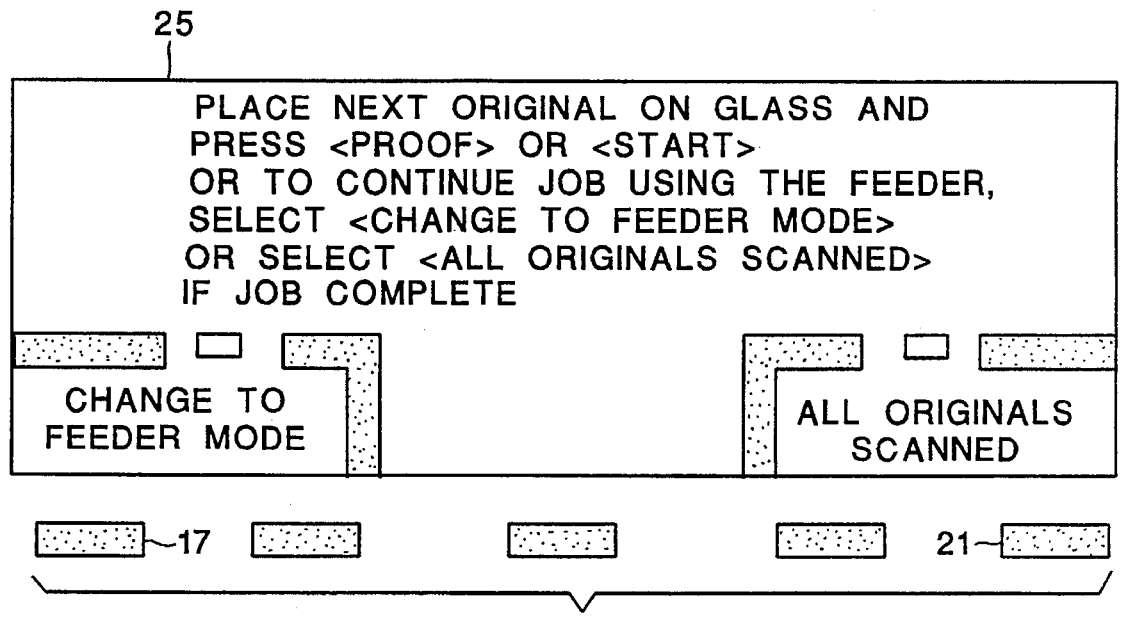
Figure 11B:
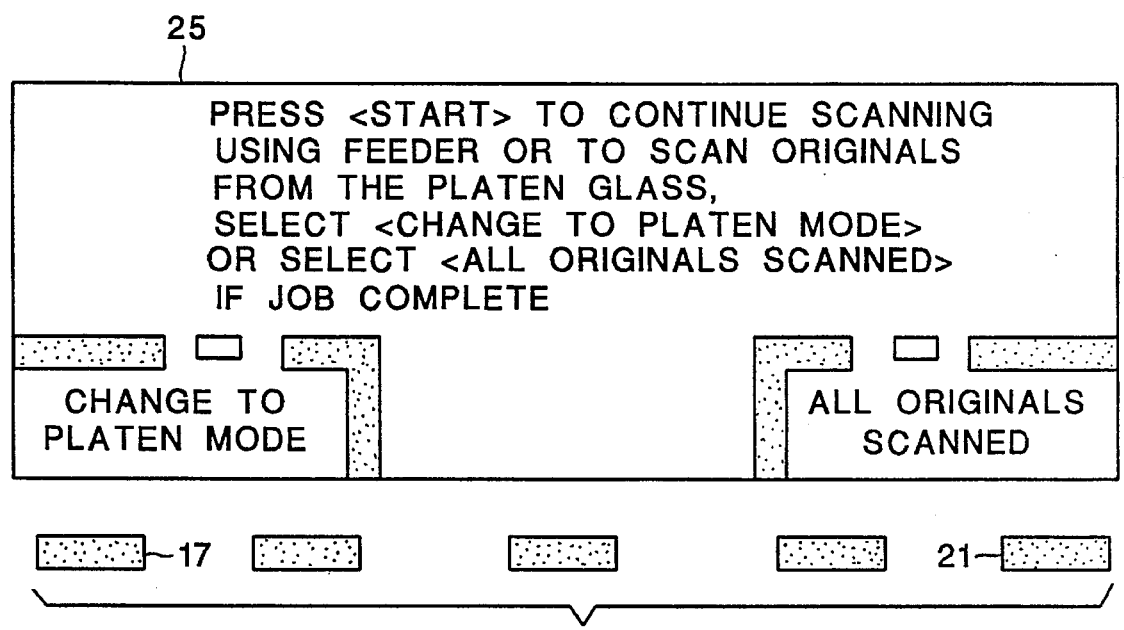

The process described above generally repeats until the feeder stops when say the input tray becomes empty, i.e., all the document sheets in the feeder are scanned (step 230). Other reasons for stopping the feeder may arise such as a jam or pause key sheet (step 240). Assuming the reason for stopping is an empty input tray, the CLP 22 does a check to see if the system determines EOJ in which case the job is complete or the operator determines EOJ (step 250). If it is the operator who determines EOJ, there is determined to be a jam (which is subsequently cleared ) or a pause key sheet that is sensed or the STOP button was pressed, then the display of FIG. 11B is displayed (step 310). At this point, the operator may choose to change to the platen mode or to indicate that all originals are scanned; i.e., job is completed (step 350) or to press the START button to resume scanning from the ADF (step 320). Note if a jam occurs, feeding and/or scanning will not begin until the jam is cleared and the START button is pressed. If the input tray is determined to be empty (step 330), a display message is provided to place originals in the tray (step 340). Upon sensing that originals are placed in the tray, the display of FIG. 11B is again provided (step 310).

Figure 14:
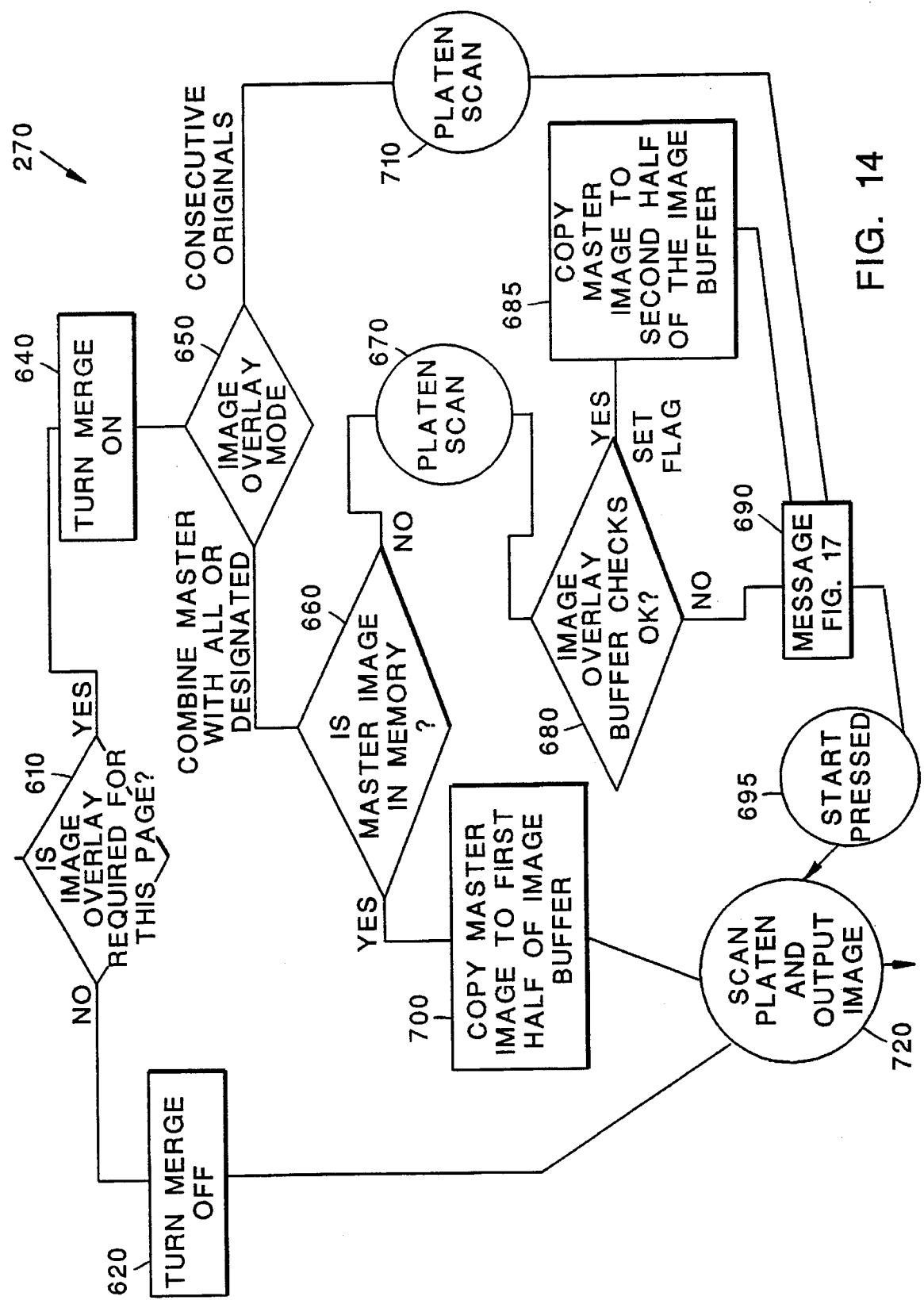

If the determination is made in step 330 that document sheets are in the feeder input tray, the process returns to step 220 for scanning of these new originals in the merge mode according to the type of merging selected. If, in step 320, the operator selects a change to platen mode, the display message of FIG. 11A is called up and displayed (step 290). The operation of platen scans in the merge mode will now be described with reference to the flowchart of FIG. 14 and step 270 of FIG. 12B.

The process for obtaining merger of images with platen scans is similar to that using the feeder. With each page to be scanned there is an inquiry as to whether or not image overlay is required for this page (step 610). If the answer is no, the merge logic control are turned off in CLP 22 (step 620) and a platen scan is made and the image of the scanned document sheet output to the JIB. If the answer is yes, the merger logic control is turned on (step 640) and a determination made of whether the image overlay mode is consecutive originals or that of combining document scans with a master original. If the selected mode is that of merger of consecutive pairs of originals, then a platen scan is executed in step 710. The image data for this document sheet is stored in the first half of the SBM. A prompt message (FIG. 17) is provided to prompt the operator to place the next original document sheet to be merged on the platen glass and press START to commence scanning of this document sheet (step 690). If START is pressed (step 695), a platen scan of the next document sheet is made and the image data thereof logically merged with that of the prior scanned document sheet upon writing into the first half of the SBM (step 720). The process then steps to step 280 (FIG. 12B) wherein a check is made to ensure that COP is still on (step 280), which it would be when platen scanning is a selected feature, and a prompt message of FIG. 11A is presented (step 290). This prompt message requests that the operator place the next original on the platen glass and press <PROOF> or <START>. Options are also provided in this prompt message to change the feeder mode using softkey 17 or to indicate that all originals have been scanned using softkey 21; i.e., job is completed. Assume that the operator places a next or third document sheet on the platen and presses the START button. The process returns to step 270 and if merger with image overlay is still valid, a platen scan is initiated in step 710 and upon writing the image data for this document sheet just scanned into memory erasure of the earlier merged image is performed. The next succeeding document is scanned and merged with the data for the third document sheet in steps 690, 695 and 720 and the process repeats until the operator indicates EOJ or changes to feeder mode.

In the event that there has been selected the feature of combine master with all or designated sheets, a determination is made in step 660 as to whether or not the master image is in memory. If not, the operator places the master on the platen and a platen scan of the master is made in step 670 and the image data thereof stored in the first half of the SBM. Buffer checks are then made in step 680 which are identical to those described for step 480 (FIG. 13). If the checks are affirmative, a flag is set and a copy of the image data in the first half of the SBM is reproduced into the second half of the SBM (step 685). The message of FIG. 17 is then provided (step 690) requesting placement on the platen of the next document sheet for scanning so that the image data thereof may be merged with the image data of the master stored in the first half of the SBM. When the START button is pressed (step 695) a platen scan is executed and the image data of this document sheet is logically merged with that of the master and the merged image data output to the JIB step 720. In repetitions of this process for succeeding document sheets, the master image stored in the second half of the SBM is copied into the first half of the SBM to obviate the need to rescan the master step 700. Of course, this assumes that the flag established by step 680 is still valid. If it is not due to an overflow of image data into the second half of the image buffer, the operator may be prompted by a screen display in preparation of a scan in step 670 to place the master on the platen.

The image data representing merged pages and perhaps image data for pages not to be merged are stored in the JIB. Collated copies of this image data are printed out by the marking engine 12 as described above.

There is thus disclosed an improved method and apparatus for providing a copier with an image overlay feature that exhibits flexible source document entry scanning to merge an image which is stream fed in the feeder with an image that was placed on the platen before the job was started. This is accomplished on one, several or all of the pages of a set without operator intervention once the job is started. It features an express glass mode to capture the master image placed on the platen glass and combines it with images which are scanned through the feeder. This feature permits jobs such as: 1) addition of company logo to every page; 2) add artwork, date, or "controlled distribution" type stamps to pages in a document; 3) merge data into a form; and 4) add graphic borders to a job.

In addition, a merge job may comprise document sheets scanned either from the platen or the feeder or both and at least some of which are selectively merged with a master original.

The invention has been described in detail with particular reference to preferred embodiments thereof and illustrative examples, but it will be understood that variations and modifications can be effected within the spirit and scope of the invention.

We claim:

1. A copier apparatus comprising:

means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed;

feeder means for automatically feeding seriatim document sheets to the scanning station for scanning document sheets in the second mode;

recording means for copying images of said document sheets;

means for generating a signal for initiating commencement of a copy job; and control means responsive to said signal for automatically actuating said scanning station for scanning said document sheet in said first mode and for actuating said feeder means for automatically feeding document sheets to the scanning station for scanning document sheets in the second mode; said control means including memory means for storing image data of said document sheet and means for logically combining the image data of said document sheet with image data of each of at least plural of said document sheets scanned in the second mode; and said recording means producing a collated copy set of said set of said document sheets with each of at least two pages of said copy set being a combination of an image on the document sheet scanned in said first mode and an image of a document sheet scanned in said second mode.

2. The apparatus of claim 1 and said apparatus including buffer memory means having a memory for storing duplicative sets of image data of said document sheet; and means for logically combining in said buffer memory means one of said duplicative sets of image data of said one document sheet with image data of a different document sheet of said set scanned in the second mode.

3. A copier apparatus comprising:

a scanning station having a scanner for electronically scanning a set of document sheets to be copied as a copy job;

a buffer memory means having a memory for storing image data of two document sheets;

control means for operating said scanner for scanning one document sheet of said set of document sheets and for storing duplicative sets of image data of said one document sheet in said buffer memory means, said control means including means for logically combining in said buffer memory means one of said duplicative sets of image data of said one document sheet with image data of a different document sheet of said set and for outputting logically combined image data of both sheets to a marking engine while retaining a second set of said duplicative sets for recopying of image data of said one document sheet into said buffer memory means; and a marking engine for producing a collated copy set of said set of document sheets with each of at least two sheets of said copy set featuring a combination of image data from said one document sheet and image data from another document sheet in said set of document sheets.

4. A copier apparatus comprising:

means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed;

feeder means for automatically feeding seriatim document sheets to the scanning station for scanning document sheets in the second mode;

recording means for copying images of said document sheets; and control means for actuating said scanning station for automatically commencing scanning of said document sheet to be scanned in said first mode and without further operator intervention commencing scanning of document sheets to be scanned in said second mode and for actuating said recording means for producing collated copies of said document set as a copy job with one copy sheet in said copy set featuring image overlaying of an image on said document sheet with at least one other document sheet in said set.

5. A method for copying document sheets comprising:

electronically scanning a set of document sheets to be copied as a copy job, the scanning being performed both in a first mode wherein a document sheet is manually positioned on the platen by an operator and in a second mode wherein document sheets are automatically fed;

displaying options for selection by an operator including selection of scanning at least one of said documents in the first mode or scanning of document sheets in said second mode and an option allowing the operator to identify that all document sheets are scanned in this copy job;

in response to operator inputs, that are in response to display of said options, generating signals representing selections by said operator to said options; and in response to said signals scanning said document sheets in said first mode and said second mode and producing a collated copy set of said document set as a copy job with each of at least two pages of said copy set being a combination of an image on a document sheet scanned in said first mode and an image of a document sheet scanned in said second mode.

6. The method of claim 5 and including generating a signal in response to an input by an operator that represents that all document sheets of said set have been scanned and in response to said signal precluding additional document sheets to be scanned as part of the copy job.

7. The method of claim 5 and wherein scanning in said first mode is automatically done in response to a key sheet being automatically fed.

8. The method of claim 6 and wherein the image data of the document sheet scanned in the first mode is obtained in a single scanning cycle and is repetitively used for producing the collated copy set.

9. The method of claim 7 and wherein the image data of the document sheet scanned in the first mode is obtained in a single scanning cycle and is repetitively used for producing the collated copy set.

10. The method of claim 5 and wherein the image data of the document sheet scanned in the first mode is obtained in a single scanning cycle and is repetitively used for producing the collated copy set.

11. A method for copying document sheets to produce a collated copy set comprising:

electronically scanning a set of plural document sheets to be copied as a copy job;

storing duplicative sets of image data of one of the scanned document sheets in a buffer memory;

logically combining in said buffer memory one of said duplicative sets of image data of said one document sheet with image data of a different document sheet of said set that is scanned and for outputting logically combined image data of both sheets to a job image buffer while retaining a second set of said duplicative sets for recopying of image data of said one document sheet into said buffer memory; and storing in said job image buffer image data for all pages of a plural page document to be copied as the copy job for producing a collated copy set;

outputting image data from said job image buffer to cause a marking engine to produce a collated copy set of said set of document sheets with plural different copy sheets in said copy set and with each of at least two copy sheets of said copy set respectively featuring a combination of image data from said one document sheet and image data from a different respective another document sheet in said set of document sheets so that said at least two copy sheets each in part includes different information from the other of the at least two-copy sheets.

12. The method of claim 11 and wherein said one document sheet is scanned in a first mode wherein the document sheet is manually positioned on a platen by an operator and other sheets of the document sheets in the set are scanned in a second mode by being automatically fed.

13. The method of claim 12 and wherein scanning of the document sheet in said first mode is automatically done in response to a key sheet being automatically fed.

14. The method of claim 13 and wherein after automatically scanning the document sheet in said first mode document sheets are automatically fed for scanning in said second mode without operator intervention.

15. The method of claim 12 and wherein a scanning station for automatically commences scanning of the document sheet to be scanned in said first mode and without further operator intervention commences scanning of document sheets to be scanned in said second mode.

16. A method for copying document sheets comprising:

scanning a set of document sheets to be copied as a copy job, the scanning being performed in a first mode wherein a document sheet is manually positioned on the platen by an operator and in a second mode wherein document sheets are automatically fed;

storing image data of the document sheet scanned in the first mode and logically combining the image data of said document sheet with image data of each of at least plural of said document sheets scanned in the second mode; and producing a collated copy set of said set of said document sheets with each of at least two pages of said copy set being a combination of an image on the document sheet scanned in said first mode and an image of a document sheet scanned in said second mode.

17. The method of claim 16 and including storing duplicative sets of image data of the document sheet scanned in the first mode wherein one of said duplicative sets is used for logically combining with image data of one of said document sheets scanned in said second mode.

18. The method of claim 17 and wherein the document sheet scanned in the first mode is scanned only once for image data for during production of a collated copy set.

19. The method of claim 16 and wherein the image data of the document sheet scanned in the first mode is obtained in a single scanning cycle and is repetitively used for producing the collated copy set.

* * * * *